(12) United States Patent
Conrado et al.

(10) Patent No.: US 6,311,991 B1
(45) Date of Patent: Nov. 6, 2001

(54) WHEELED COOLER

(75) Inventors: Ann-Marie Conrado; Alice Mensch; Bart Massee, all of Chicago; Craig Scherer, Wilmette, all of IL (US)

(73) Assignee: The Thermos Company, Schaumburg, IL (US)

( * ) Notice: Subject to any disclaimer, the term of this patent is extended or adjusted under 35 U.S.C. 154(b) by 0 days.

(21) Appl. No.: 09/616,296

(22) Filed: Jul. 14, 2000

Related U.S. Application Data

(62) Division of application No. 09/133,307, filed on Aug. 13, 1998, now Pat. No. 6,176,499.

(51) Int. Cl.[7] .................................................... B62B 1/02
(52) U.S. Cl. ...................... 280/47.26; 280/655; 62/457.1
(58) Field of Search .............................. 280/37, 38, 641, 280/645, 43.1, 47.24, 655, 47.2, 47.26, 30, 31, 79.5, 63; 190/18 A; 62/457.1, 457.2

(56) References Cited

U.S. PATENT DOCUMENTS

| | | |
|---|---|---|
| D. 296,065 | 6/1988 | Tarozzi et al. . |
| D. 369,695 | 5/1996 | Imotani . |
| 4,488,623 | 12/1984 | Linnell, II et al. . |
| 4,581,902 | 4/1986 | Starck et al. . |
| 4,846,493 | 7/1989 | Mason . |
| 4,873,841 | 10/1989 | Bradshaw et al. . |
| 5,228,706 | 7/1993 | Boville . |
| 5,285,656 | 2/1994 | Peters . |
| 5,306,029 | 4/1994 | Kaiser, II . |
| 5,313,817 | 5/1994 | Meinders . |
| 5,373,708 | 12/1994 | Dumoulin, Jr. . |
| 5,407,218 | 4/1995 | Jackson . |
| 5,423,195 | 6/1995 | Peters . |
| 5,465,985 | 11/1995 | Devan et al. . |
| 5,480,170 | 1/1996 | Kaiser, II . |
| 5,551,558 | 9/1996 | Bureau . |
| 5,730,282 | 3/1998 | Bureau . |
| 5,781,853 | 7/1998 | Johnson . |
| 5,947,032 | 9/1999 | Meier . |

*Primary Examiner*—Richard M. Camby
(74) *Attorney, Agent, or Firm*—Wood, Phillips, VanSanten, Clark & Mortimer

(57) ABSTRACT

An improved portable cooler includes a cooler body (10) provided with wheels (36) and a pivoted towing handle (16) provided with two grips (140,142) to allow use of the cooler by persons of both tall and short stature. The cooler cover (12) is provided with a recess (44) and a closure panel (58) for storage of items within the cooler but above melting ice or relatively heavy items that might crush items contained in the cooler. A table assembly (14) is operable independently of the lid (12) allowing the table (14) to be deployed on a leg (78) with the cooler lid (12) in a closed position, as well as to allow access to the interior cavity (28) of the cooler without clearing the table (14). Retractable bungee cords (108) for securing items to the cooler are provided.

4 Claims, 5 Drawing Sheets

WHEELED COOLER

CROSS REFERENCE

This application is a division of application Ser. No. 09/133,307 filed Aug. 13, 1998, now U.S. Pat. 6,176,499.

FIELD OF THE INVENTION

This invention relates to portable coolers.

BACKGROUND OF THE INVENTION

Portable coolers are seeing an increase in popularity, particularly as their portability has been enhanced. They are, of course, used in various outings, including picnics, as well as at parties and the like to maintain food and beverages at a desired temperature, usually, but not always, below the temperature of the ambient. To enhance the versatility of such coolers, many are made with wheels and a handle for pulling the cooler on the wheels.

Typical wheeled coolers perform their intended function of providing portability, but in many instances, are aggravating to use. Because, for example, compactness is a desirable feature in such a cooler, the handles may be relatively short with a consequence that the user, grasping the handle to pull the cooler, may feel the cooler literally nipping at the user's heels because the cooler must be towed directly behind the user.

Moreover, conventional handle designs do not take into account the stature of users of a wheeled cooler. A long handle suitable for a person of tall stature may make it impossible for a person of short stature, such as a child, to tow a cooler by the handle without the cooler dragging on the underlying terrain, when the cooler is provided with only two wheels.

Still another difficulty arises where the towing handle is freely pivoted to the cooler. In such a case, if the person pulling the cooler stops relatively abruptly, the momentum of the cooler may cause it to continue to move forward. Because the handle is pivoted to the cooler and free to move, in a typical case, to or even past a purely vertical position, the cooler may coast into the legs of the user.

Many coolers have flat upper surfaces on their lids or covers which may be used as a table surface. However, when the lid or cover is being used as a table surface, it is impossible to achieve access to the interior of the cooler without first taking all objects off of the lid of the cooler. Furthermore, where coolers are taken on outings away from a residence, it is not uncommon that the user of the cooler will be bringing other objects as well. For example, if the user were going to the beach, lawn chairs and/or blankets and/or towels would typically be brought along. Handling these items in addition to the cooler makes transportation of the ingredients of the beach party a difficult chore.

A further problem with conventional coolers occurs when one is transporting items in the cooler that are intended to remain dry and/or are subject to crushing. As is well known, it is typical to fill the bottom of a cooler with beverage cans or bottles along with ice to maintain the items at a cold temperature. Eventually the ice melts and if other food items that are not intended to be wetted are in the cooler, the water from the ice may saturate the food items and make them unpalatable. Moreover, such food items as, for example, sandwiches, even if placed in sealed plastic bags or the like, are subject to crushing as heavy beverage cans or bottles shift within the cooler cavity.

The present invention is directed to providing a cooler that meets one or more of the above concerns.

SUMMARY OF THE INVENTION

It is the principal object of the invention to provide a new and improved portable cooler.

According to one facet of the invention, a cooler is provided that includes a cooler body of insulating material and which has an internal cavity having an upper access opening for receipt of items whose temperature is to be maintained at a predetermined level. A cover is provided for the access opening and a first hinge pivots the cover to the cooler body. A table element that includes edges and a lower table surface overlies the cover. A second hinge pivots one of the edges of the table element to one of the cover and the body. A leg is provided and overlies the cover. The leg has a length generally the same as the height of the body and a third hinge pivots the leg to the table element oppositely of the table surface and at a location spaced from the second hinge.

As a consequence, the table element resides compactly on top of the cover during transportation of the cooler and yet may be opened with the leg unfolded to provide a table surface adjacent to the cooler body. The use of the separate table surface enables one to use the table surface and yet achieve access to the interior of the cooler body by opening the cover without first clearing the table surface.

In a preferred embodiment, the first and second hinges respectively pivot the cover and the table about a common pivot axis.

In one embodiment, the table element includes a recess oppositely of the table surface and the leg nests in the recess.

A preferred embodiment of the invention includes a hook at an edge of the table element and in the table surface at a location spaced from the second hinge. The hook may be used to support a waste receptacle such as a plastic garbage bag.

A preferred embodiment includes stops on the table element for engaging the leg to limit movement of the leg from a stored position nested within the recess to an extended position approximately 90° therefrom.

According to another aspect of the invention, a cooler is provided which includes a cooler body and lid having an internal cavity for receiving items whose temperature is to be maintained at a desired level. A pulling handle is attached to the cooler body and lid and wheels are disposed on the cooler body and lid so that the cooler body and lid may be pulled over the underlying terrain. A pair of horizontally spaced openings are disposed in the cooler body and lid and an elongated bungee cord having opposed ends is provided. The ends of the bungee cord are received in and restrained in a respective one of the openings. As a consequence, other non-cooler items to be transported, such as chairs, blankets or the like, may be placed on the cover and lid and secured thereto through the use of the bungee cord, making it necessary only to pull the cooler rather than pull the cooler and carry the additional items.

In a preferred form of this facet of the invention, the cooler body and lid include an upwardly opening cooler body and a lid element pivoted thereto. The openings receiving the ends of the bungee cord are located in the lid element.

Preferably, the bungee cord is in tension and even more preferably, a groove extends between the openings so that the tension in the bungee cord normally causes the bungee cord to retract and nest in the groove to be out of the way except when being used to secure other items to the cooler and lid.

In a preferred embodiment, there are two pairs of the openings, one on each of the opposed sides of the cooler body and lid and two of the bungee cords, one for each of the two pairs of openings.

Preferably, one of the bungee cords includes a hook intermediate its ends so it can be hooked to the opposite bungee cord across items to be transported.

According to still another facet of the invention, there is provided a cooler that includes a cooler body of insulating material having an internal cavity and an upper access opening as before, together with a cover for the access opening. A hinge pivots the cover to the cooler body and a recess is located in the cover so as to face the cavity in the body. A flexible, fabric-like panel is secured to the cover about the recess to define an item-receiving pocket between the cover and the panel.

Preferably, the panel is formed of a mesh.

In a preferred embodiment, the recess in the panel are rectangular and the panel is secured to the cover about three sides of the recess. The panel further includes a free side defining an access opening to the pocket.

As a consequence of this construction, items that are to be placed in the cooler, but are to be remain dry or are subject to crushing, may be stored in the pocket on the underside of the cover to the free from contamination by water from melting ice and/or the possibility of crushing by moving beverage containers or the like.

According to still another facet of the invention, a cooler is provided that includes a cooler body of insulating material and which has a cavity with an upper access opening. A cover is pivoted to the body for movement between positions opening and closing the access opening and at least two wheels are rotatably mounted on the body for rotation about a wheel axis at the lowermost edge of the body. An elongated handle having an end pivotally mounted to the body for rotation about a pivot axis that is generally parallel to and spaced from the wheel axis is provided. The handle has an end opposed to the pivoted end and a first grip opening is located at the opposed end. A second grip opening is disposed between the ends and adjacent the first grip opening so that persons of tall stature may grip the handle through the first grip opening and persons of short stature may grip the handle through the second grip opening.

As a consequence, the cooler is well suited for easy transportation by persons of varying stature.

In a preferred embodiment, the handle includes opposed sides and the first grip opening is defined by first and second spaced webs extending between the sides. The first web is closest to the opposed end and is concave in the direction facing the pivotally mounted end.

As a consequence of this construction, a person pulling the cooler may grip the handle at one side or the other of the concave grip opening with the result that the cooler will track to one side of the person when being pulled so as to avoid interference with the legs or heels of the person using the same.

In a preferred embodiment, the second web is also concave in the direction facing the pivotally mounted end, providing the same function for persons of short stature.

According to another facet of the invention, a wheeled cooler generally as before, i.e., with a cooler body of insulating material and a cavity with an upper access opening, a cover pivoted to the body for movement between positions opening and closing the access opening, two wheels rotatably mounted on the body for rotation about a first axis, and an elongated handle having one end pivotally mounted to the body for rotation about a second pivot axis is provided. According to this facet of the invention, the cooler further includes a stop on the body and located to engage the handle and halt pivotal movement thereof at an angular position between the horizontal and the vertical to thereby rigidify the pivotal connection between the handle and the body to allow a person pulling the cooler by the handle to readily halt movement of the cooler. As a result of this feature of the invention, when a person pulling the cooler abruptly stops, as the cooler tends to move forward the handle encounters the stops rather than pivoting further towards a vertical position, which in turn halts movement of the cooler. Contact with the user's heels or legs is thereby avoided.

According to still another facet of the invention, there is provided a wheeled cooler generally as before. According to this facet of the invention, the body has opposed sides and the handle is pivoted to one of the opposed sides. Lifting grips are located on each of the opposed sides and an access opening extends through the handle and is positioned to allow access to the lifting grip on the other side through the handle. As a consequence, when the cooler is not being towed, it is readily lifted by the lifting grips without moving the handle.

Other objects and advantages will become apparent from the following specification taken in connection with the accompanying drawings.

DESCRIPTION OF THE PREFERRED EMBODIMENT

Figure 1:
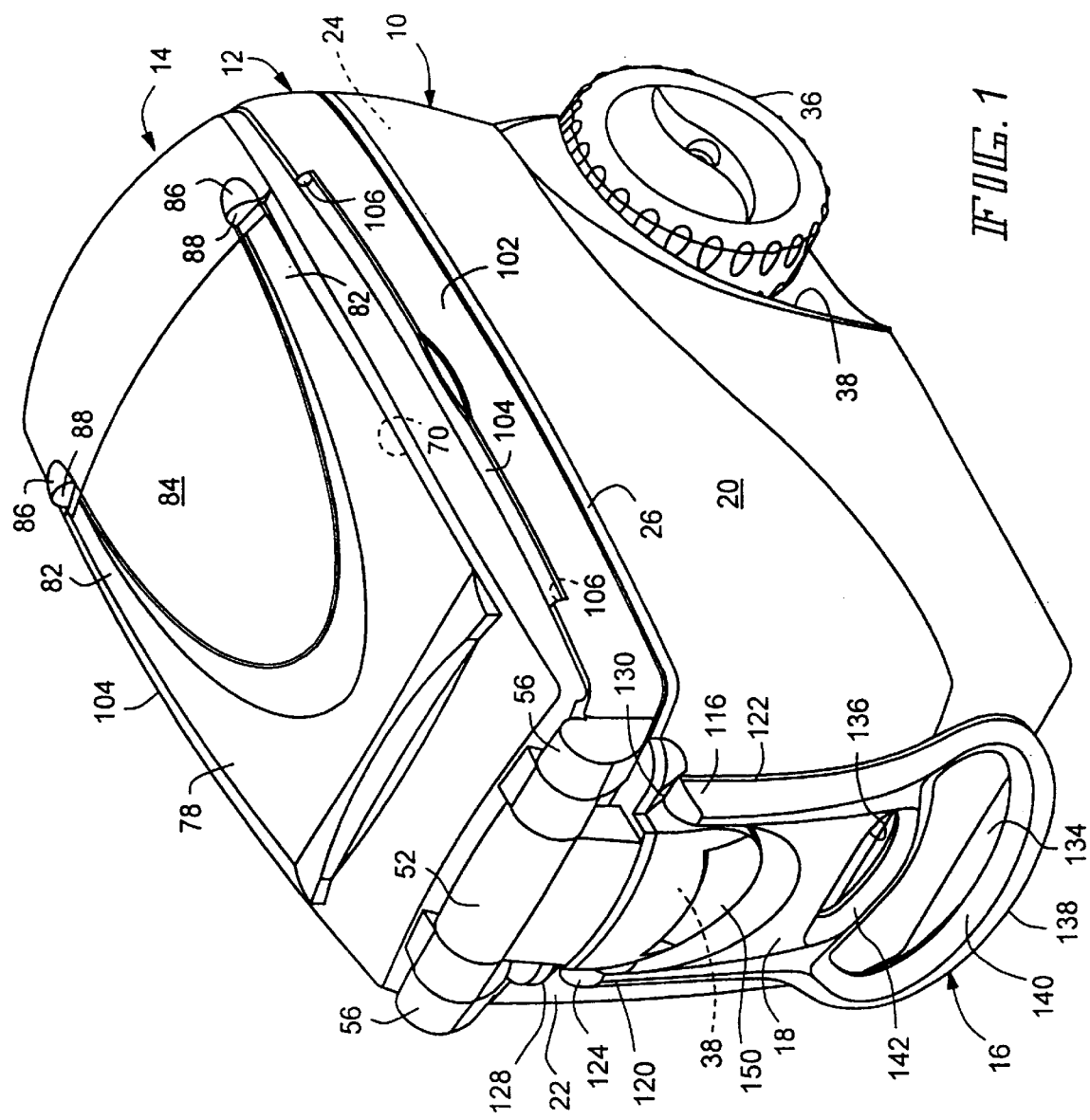
FIG. 1 is a perspective view of an exemplary embodiment of a portable cooler made according to the invention.

An exemplary embodiment of a portable cooler made according to the invention is illustrated in the drawings as a single exemplary embodiment of the invention. However, it is to be understood that while, ideally, all of the many features of the invention will be employed in a single structure, many of the features may be used independently of one another or in combination with just one or a few of the other features. No limitation to the use of all of the features of the invention in a single structure is intended except insofar as expressed in the claims.

Referring to FIG. 1, the exemplary embodiment of the portable cooler includes four principal components including a cooler body, generally designated 10, a rectangular lid or cover, generally designated 12, which is pivoted to the body 10 by means to be seen, a table, generally designated 14, which is also pivoted to the body 10, and a handle, generally designated 16, which is pivoted to the body 10.

Figure 3:
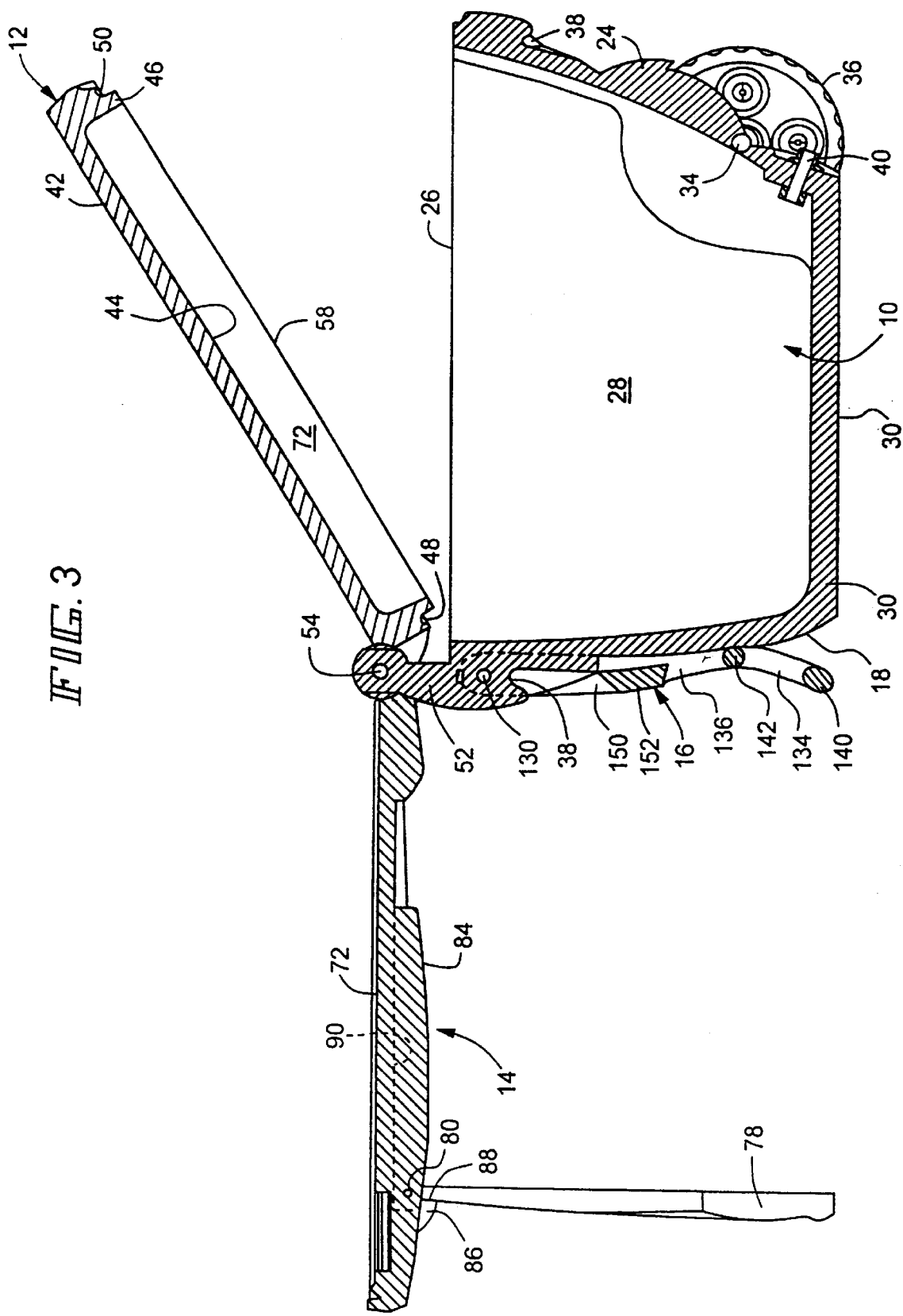
FIG. 3 is a vertical sectional view of the cooler with the table extended and the lid partially opened.

Addressing the body 10, the same includes a forward wall 18, opposed side walls 20,22, and a rear wall 24. The same is generally rectangular in configuration and includes an upper edge 26 which surrounds an interior cavity 28 (FIG. 3). The body 10 is made up of insulating material 30 as is well known. Conventionally, the same will include an inner shell (not shown), an outer shell, and foam forming the insulating material 30.

Also as seen in FIG. 3, the body 10 has a lower or bottom wall 32 and just above the junction of the bottom wall 32 and the rear wall 24, axles 34 (only one of which is shown) respectively mount a pair of wheels 36 for rotation about a generally horizontal axis. Desirably, and as seen in FIG. 1, the wheels 36 are located in recesses 38 in the side walls 20,22 and extend just below the bottom wall 32 as seen in FIG. 3.

On the end walls 18,24, the body 10 includes integral handles defined by generally downwardly opening notches 38. The user of the cooler may insert their fingers into the notches 38 to lift the cooler as, for example, when loading or unloading the same from the trunk of a vehicle. Desirably, the body 10 also includes, adjacent the wheels 36, a removable drain plug 40.

Figure 2:
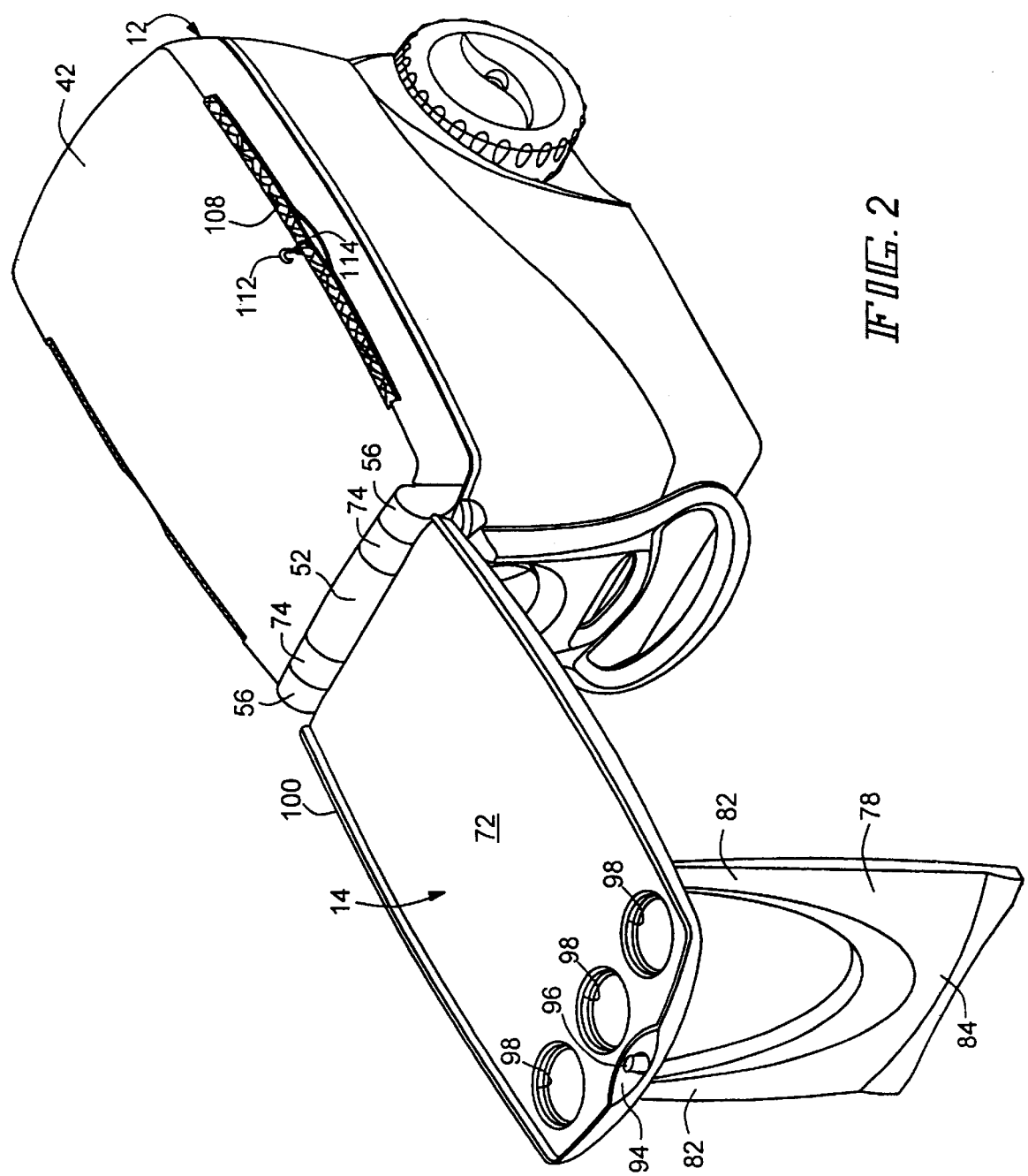
FIG. 2 is a perspective view of the cooler with its table surface extended.

Turning now to the lid 12, as seen in FIG. 2, the same includes a flat upper surface 42 and as seen in FIG. 3, a recess 44 in its lower surface and surrounded by a peripheral lip 46. If desired, a seal and groove combination 48 may be disposed about the exterior of the lid 46 for sealing engagement with the upper edge 26 of the body 10. At the end of the lid 12 corresponding to the rear wall 24 of the body 10, a small hand grip recess 50 may be located to allow the user to easily grasp the lid 12 by its edge for opening purposes.

At its forward wall 18, the body 10 includes an upstanding post 52 which extends upwardly of the upper edge 26 and which mounts a horizontally disposed pivot pin 54 which is parallel to the axles 34. As seen in FIGS. 1 and 2, the corresponding edge of the lid 12 includes upstanding lugs 56 which are impaled on the pivot pin 54 so as to enable the lid 12 to be pivoted between opened and closed positions permitting or denying access to the interior cavity 28.

Figure 5:
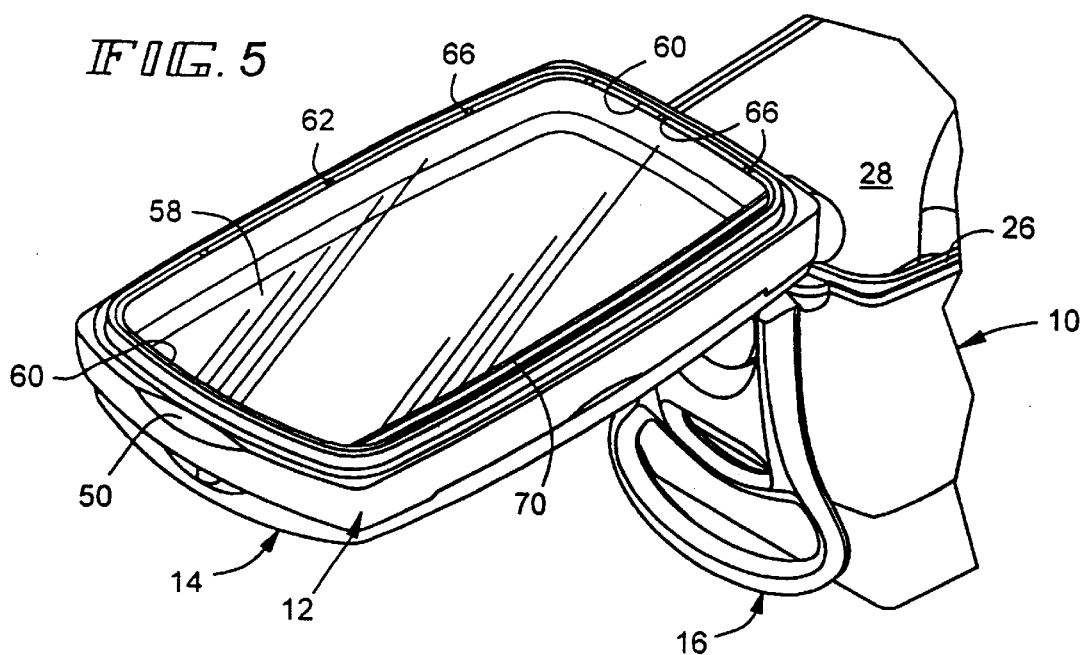
FIG. 5 is a fragmentary perspective view of the cooler with the lid opened.

As seen in FIGS. 3 and 5, the peripheral edge 46 of the undersurface of the lid 12 mounts a fabric-like panel 58. In a preferred embodiment, the panel 58 is a somewhat resilient mesh and is rectangular in form, as is the recess 44. Three edges 60, 62 and 64 of the panel 58 are secured by a conventional fastener 66 to the lip 46. The panel 58 also has a free edge 70 and with the recess 44, defines a pocket 72 which is ideally suited for receipt of goods that are to be kept away from melting ice within the cavity 28 or which are subject to crushing. That is to say, the panel 58 and the recess 44 define a pocket 72 with the free edge 70 defining an access opening whereby items of the foregoing category may be located within the pocket 72 and suspended therein when the lid 12 is closed in an elevated position above melting ice and/or beverage containers such as cans or bottles. Thus, such items may be cooled along with others, but are thus protected from wetting and/or crushing.

The table 14 includes a flat table surface 72 which, when the table 14 is stowed, is in abutment with the upper surface 42 of the lid 12. At one end, the table 14 includes upstanding lugs 74 which are located inwardly of the lugs 56 and outwardly of the post 52 and also impaled on the pivot pin 54 (FIG. 3) whereby the table 14 is pivotally mounted on the assemblage.

The table 14 includes a leg structure 78 which is pivoted by a pivot pin 80 to the side of the table 14 opposite the table surface 72 for movement between a stowed position such as shown in FIG. 1, for example, to a deployed position, such as shown in FIGS. 2 and 3. As best seen in FIG. 2, the leg structure 78 is generally U-shaped and includes a pair of legs 82 which are spaced from one another and interconnected by a bight 84. The ends of the legs 82 are impaled on the pivot pin 80. As seen in FIG. 1, immediately adjacent the point of attachment of the legs 82 to the pivot 80. The surface 84 opposite from the table surface 72 includes a pair of upstanding projections 86 provided with flat stop surfaces 88 which face the legs 82. The stop surfaces 88 limit movement of the leg 78 to approximately 90° between the stowed position illustrated in FIG. 1 and the deployed position illustrated in FIGS. 2 and 3.

Desirably, the surface 84 of the table 14 includes a recess 90 of the same configuration as the leg 78 to substantially fully receive the leg 78 in the retracted or stowed position as illustrated in FIG. 1. If desired, suitable detents (not shown) may be employed to releasably retain the leg 78 within the recess 90.

It is to be particularly noted that the vertical length of the leg 78 is substantially the same as the vertical distance between the bottom wall 32 of the body 10 and the upper edge 26 so that when the leg 78 is deployed, the table surface 72 will be horizontal.

Desirably, the side of the table 14 remote from the pivot 54 includes a small recess 94 which may receive the fingers of the user to assist in pivoting the table 14 away from the cover or lid 12. In this recess, a projection 96 acts as a hook. The same is adapted to impale a container, such as a plastic garbage bag, and suspend the same from the edge of the table 14. Additionally, the table surface 72 may have a plurality of glass holding recesses 98 at any desired location.

The table surface 72 is surrounded on three edges by a peripheral, relatively short wall 100. The wall 100 helps to retain items on the table surface 72 when the table is in use. Similar restraint on the fourth side is provided by the post 52 and the lugs 56,74.

Figure 4:
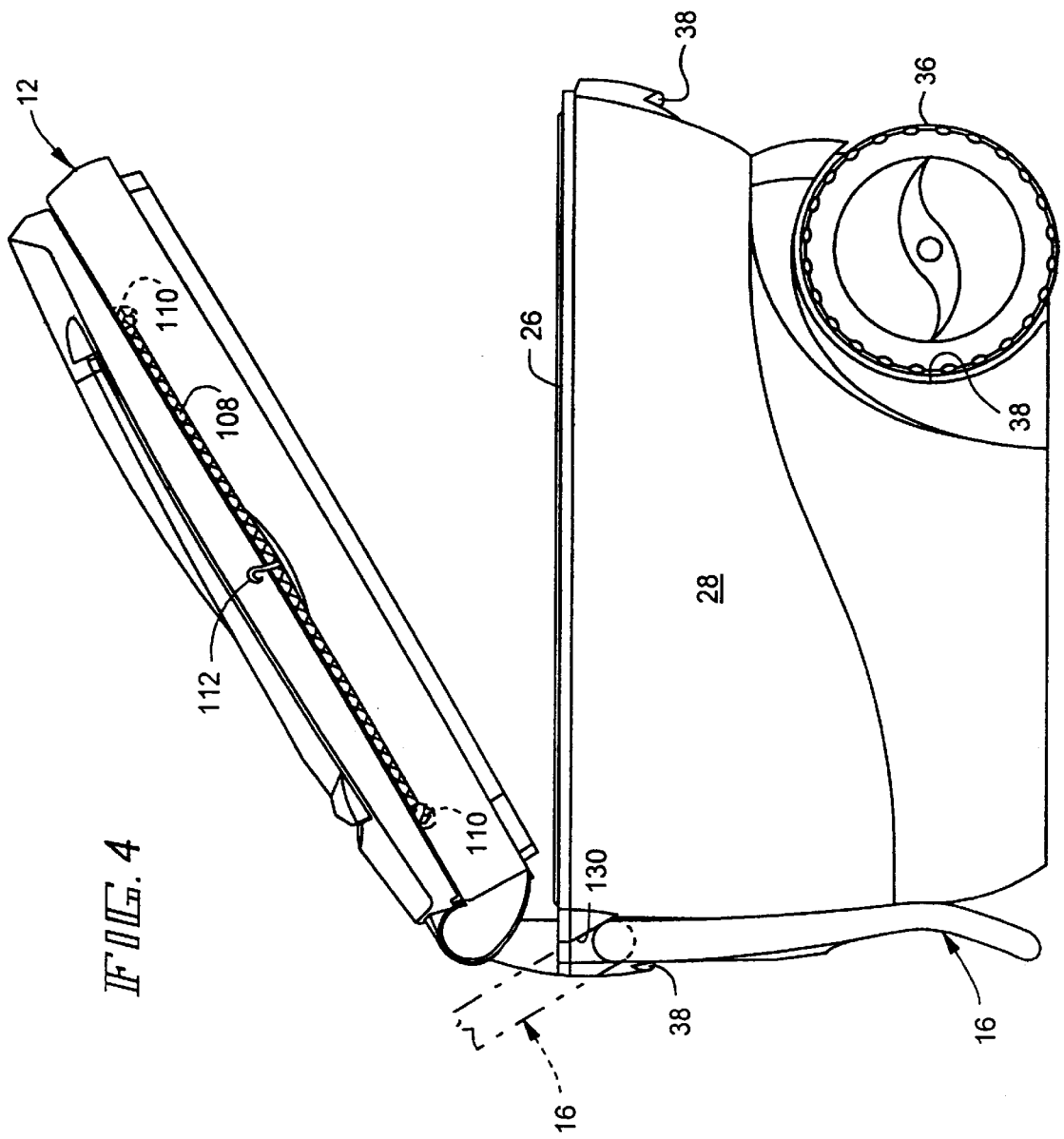
FIG. 4 is a side 4 elevation of the cooler with the table nested against the lid and the lid partially opened.

Returning to FIG. 1, the sides 102,104 of the lid 12 overlying the walls 20,22 of the body 10, include elongated, horizontal grooves 104 (only one of which is shown) which terminate in spaced openings 106 in the lid 12. As seen in FIG. 2, conventional bungee cords 108 are located in the grooves 104 and have opposed ends extending through the openings 106 at the ends of each groove 104. As seen in FIG. 4, within the cover or lid 12, the ends of the bungee cords 108 terminate in knots 110 which hold the bungee cords 108 assembled to the lid 12. The arrangement is such that each bungee cord 108 will be somewhat stretched when located in the groove, that is, in tension.

Generally centrally of one of the bungee cords 108, a metallic hook 112 is located.

Figure 6:
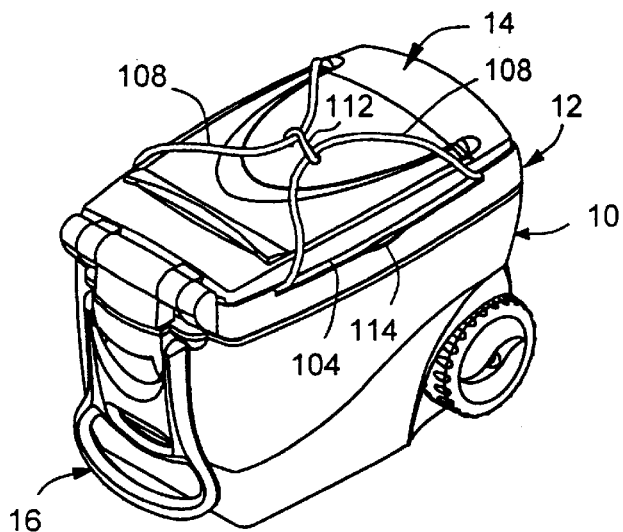
FIG. 6 is a perspective view illustrating one configuration of bungee cords incorporated in the cooler.
Figure 7:
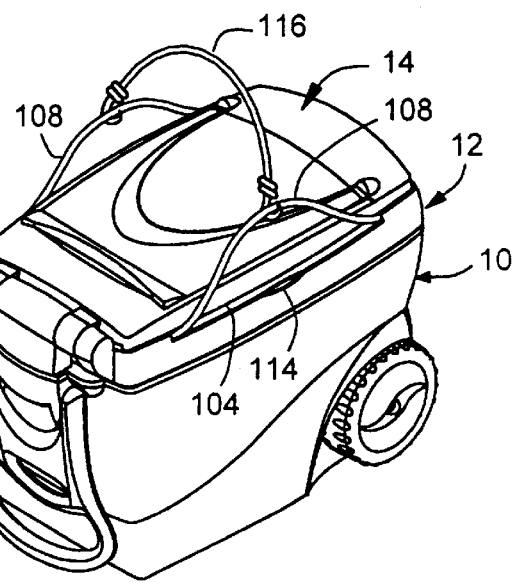
FIG. 7 is a view similar to FIG. 6, but showing another configuration of the bungee cords.

As a consequence of this construction, and with the assistance of a small recess 114 underlying the central part of each bungee cord 108, the bungee cords may be pulled from grooves 104 and coupled together as illustrated in FIG. 6 to overlie other items (not shown) to be transported with the cooler on the exterior thereof. In some instances, it may be desirable to add a third bungee cord 116 to extend between the two bungee cords 108.

This arrangement provides for easy attachment of other items such as lawn chairs, towels, blankets, another cooler or the like to the upper surface of the cooler for transportation purposes. At the same time, because the bungee cords 108 are under tension, when they are not being used, they will withdraw into the grooves 104 to be out of the way and to remain therein until their use is required.

Turning now to FIGS. 1, 3 and 4, the handle 16 will be described in greater detail. As seen in FIG. 1, the handle 16 includes spaced, opposed sides 120,122 whose ends 124,126 are captured on a pivot pin 130 (FIG. 3) located below the pivot pin 54 and just below the upper edge 26 of the body 10. Extending diagonally just above the ends 124,126 are a pair of stop surfaces 128,130 against which the opposed sides 120,122 abut to limit movement of the handle 16 between the solid line and fragmentary dotted line positions illustrated in FIG. 4. The purpose of this construction is to prevent the handle 116 from pivoting beyond the position shown 116 more toward or even past the vertical as, for example, when the user of the cooler stops walking. In such a case, the momentum of the cooler will tend to cause the same to continue to roll in the direction it is being pulled and into the heels or legs of the user. However, before that can occur, the leg sides 120,122 will abut the respective stops 128,130 to rigidify the connection between the handle 16 and the cooler body 10. Assuming the user does not release the handle 1 16 at this time, this will immediately halt further rolling movement of the cooler before it comes into contact with the user's heels or legs.

Returning to FIG. 1, the handle 16 is seen to include two grip openings 134 and 136. The opening 134 is at the end 138 of the handle 16 remote from the pivot 130 (FIG. 3) while the opening 136 is located between the ends of the handle 116 but closely adjacent the opening 134. As can be seen from FIG. 3, this results in the presence of two gripping webs 140,142 extending between the sides 120,122. It is to be particularly observed that the gripping web 140 is concave in the direction of the pivot pin 130. It is also to be observed that the end 138 is enlarged in a direction transverse to the direction of elongation of the handle 16 and is bulbous in shape. As a consequence of this, the web 138 may be grasped on one or the other of its sides allowing the user to grasp the same at a location offset from the centerline of the cooler. As a consequence, when pulling the cooler, the cooler will track to one side of the user rather than directly behind the user where it might encounter the heels or legs of the user.

The web 142 is likewise concave in the direction of the pivot pin 130 for the same purpose.

The provision of two gripping webs 140,142 enables easy use of the cooler by persons of tall stature as well as short stature. A tall person may grip the web 140 while a person of short stature, such as a child, may grip the web 142. In either case, the front wall 18 of the body 10 will be elevated above the underlying terrain sufficiently that it will not drag thereon and the cooler may be towed on the wheels 36.

A further opening 150 defined by a web 152 located between the opening 150 and the opening 136 provides a means for access to the grip recess 38 on the front wall 18 of the body 10 so that the user need not be required to move the handle 16 to achieve such access. Additionally, the presence of the webs 140, 142 and 152 provide great rigidity and structurally strength to the handle 16 as well.

From the foregoing, it will be appreciated that a portable cooler made according to the invention overcomes the many difficulties associated with the use of conventional portable coolers. For one, the table 14 may be deployed and used with the cover 12 in a closed position. Further, the cover 12 may be opened to achieve access to the contents of the cavity 28 without having to remove objects from the table 14.

The pocket 72 provides a means for storage of dry items or items that are subject to crushing at a location out of the way of melting ice and/or relatively heavy beverage containers within the cavity 28 which could crush such items.

The unique handle configuration provides several advantages. For one, the use of two grips in the form of the webs 140,142 allow the cooler to be pulled readily by persons of both short and tall stature. The presence of the stops 128, 130, prevent a pulled cooler from coasting into the heels or legs of the user when the user stops. Similarly, the curved configuration of the gripping webs 140,142, allow the pulling force to be applied to one side of the centerline of the cooler, again to avoid contact between the cooler and the heels or legs of the user.

The unique arrangement of the bungee cords 108 and the hook 12 allow the cooler to not only be pulled to transport its contents, but to allow it to serve as a trailer for the support of other items such as lawn chairs, blankets, towels, etc., eliminating the need to both carry such items and pull the cooler as well. At the same time, the grooves 104 allow full retraction of the bungee cords so that they are out of the way when not being used. Similarly, the recess in which the leg 78 for the table 14 is received allows ready stowage of the table.

What is claimed is:

1. A cooler comprising:

a cooler body and lid including an internal cavity for receiving items whose temperature is to be maintained at a desired level, said cooler body and lid including an upwardly opening cooler body and a lid element pivoted thereto;

a pulling handle attached to one or the other of said cooler body and lid;

wheels on said cooler body and lid whereby said cooler body and lid may be pulled over the underlying terrain;

a pair of horizontally spaced openings in one or the other of said cooler body and lid and adjacent the upper end of said one or the other of said cooler body and lid, said openings being located in said lid element; and an elongated bungee cord having opposed ends, said ends being received and restrained in a respective one of said openings.

2. A cooler comprising:

a cooler body and lid including an internal cavity for receiving items whose temperature is to be maintained at a desired level;

a pulling handle attached to one or the other of said cooler body and lid;

wheels on said cooler body and lid whereby said cooler body and lid may be pulled over the underlying terrain;

a pair of horizontally spaced openings in one or the other of said cooler body and lid;

an elongated bungee cord having opposed ends, said ends being received and restrained in a respective one of said openings, said bungee cord being in tension; and a groove extending between said openings, the tension in said bungee cord normally causing said bungee cord to retract and nest in said groove.

3. A cooler comprising:

a cooler body and lid including an internal cavity for receiving items whose temperature is to be maintained at a desired level;

a pulling handle attached to one or the other of said cooler body and lid;

wheels on said cooler body and lid may be pulled over the underlying terrain;

two pairs of horizontally spaced openings, in one or the other of said cooler body and lid, one on each of two opposed sides of one or the other of said cooler body and lid; and two bungee cords, one for each of said pairs of openings, said ends being received and restrained in a respective one of said openings.

4. The cooler of claim 3 wherein one of said bungee cords includes a hook intermediate its ends.

* * * * *